US009806562B2

(12) United States Patent
Tseng et al.

(10) Patent No.: US 9,806,562 B2
(45) Date of Patent: Oct. 31, 2017

(54) NETWORK DISTRIBUTED DYNAMIC EQUALIZED POWER SUPPLY METHOD

(71) Applicant: GCCAlliance Inc., Beijing (CN)

(72) Inventors: Stone Tseng, Beijing (CN); Zhiqiang Wang, Beijing (CN); Zhi Li, Beijing (CN); Ning Li, Beijing (CN)

(73) Assignee: GCCAlliance Inc., Beijing (CN)

( * ) Notice: Subject to any disclaimer, the term of this patent is extended or adjusted under 35 U.S.C. 154(b) by 0 days.

(21) Appl. No.: 15/107,942

(22) PCT Filed: Dec. 25, 2014

(86) PCT No.: PCT/CN2014/094871
§ 371 (c)(1),
(2) Date: Jun. 24, 2016

(87) PCT Pub. No.: WO2015/096751
PCT Pub. Date: Jul. 2, 2015

(65) Prior Publication Data
US 2016/0336798 A1    Nov. 17, 2016

(30) Foreign Application Priority Data
Dec. 25, 2013  (CN) .......................... 2013 1 0724531

(51) Int. Cl.
*H02J 9/00*   (2006.01)
*H02J 9/06*   (2006.01)
(Continued)

(52) U.S. Cl.
CPC ................ *H02J 9/061* (2013.01); *H02J 1/12* (2013.01); *H02J 7/0052* (2013.01);
(Continued)

(58) Field of Classification Search
CPC .......... H02J 1/12; H02J 7/0052; H02J 7/0063; H02J 7/0068; H02J 7/022; H02J 9/061; H02J 2007/0059; H02J 7/34
(Continued)

(56) References Cited

U.S. PATENT DOCUMENTS

2014/0157008 A1\*  6/2014  Ammu ...................... G06F 1/30
                                                              713/300
2015/0180232 A1\*  6/2015  Mino ........................ H02J 1/08
                                                              307/23

FOREIGN PATENT DOCUMENTS

CN        102368631 A      3/2012
CN        103066677 A      4/2013
(Continued)

*Primary Examiner* — Rexford Barnie
*Assistant Examiner* — Toan Vu
(74) *Attorney, Agent, or Firm* — SZDC Law P.C.

(57) ABSTRACT

A Network Distributed Dynamic Equalized Power Supply Method includes the following steps: multiple High Voltage Direct Current power supply devices deployed in parallel, the entire High Voltage Direct Current power supply devices parallel connected via the Direct Current Power Grid; there being four power supply modes pre-set in each device, the initial setting part being that the power supply mode of back-up High Voltage Direct Current power supply device being mode B, and the rest being mode A, the power supply voltage of the entire High Voltage Direct Current power supply devices to the Direct Current Power Grid being the same. As per the operation status of one certain High Voltage Direct Current power supply device or the change of power supply load, the power supply mode of the High Voltage Direct Current power supply device and the power supply voltage to the Direct Current Power Grid are changed.

2 Claims, 2 Drawing Sheets

(51) Int. Cl.
  *H02J 1/12*      (2006.01)
  *H02J 7/00*      (2006.01)
  *H02J 7/02*      (2016.01)
  *H02J 7/34*      (2006.01)

(52) U.S. Cl.
  CPC .......... *H02J 7/0063* (2013.01); *H02J 7/0068* (2013.01); *H02J 7/022* (2013.01); *H02J 7/34* (2013.01); *H02J 2007/0059* (2013.01)

(58) Field of Classification Search
  USPC .......................................................... 307/66
  See application file for complete search history.

(56) References Cited

FOREIGN PATENT DOCUMENTS

| | | |
|---|---|---|
| CN | 103441562 A | 12/2013 |
| CN | 103701189 A | 4/2014 |
| JP | 2010263668 A | 11/2010 |

* cited by examiner

Step 1: Pre-setting Four Power Supply Modes in a High Voltage Direct Current Power Supply Device Mode A: a rectifier module in the High Voltage Direct Current power supply device converting AC into DC to supply power to a load connected with the High Voltage Direct Current power supply device, in the meantime, to charge a battery inside the High Voltage Direct Current power supply device.

Mode B: the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to a DC Grid.

Mode C: the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device.

Mode D, the High Voltage Direct Current power supply device inputting DC from the DC Grid, to supply power to the load connected with the High Voltage Direct Current power supply device, in the meantime, to charge the battery inside the High Voltage Direct Current power supply device.

Figure 2

NETWORK DISTRIBUTED DYNAMIC EQUALIZED POWER SUPPLY METHOD

This application is a PCT National Stage Application of PCT/CN2014/094871, filed on Dec. 25, 2014, which claims the benefit of China Patent Application Ser. No. 201310724531.0, field on Dec. 25, 2013, which is incorporated by reference for all purposes as if fully set forth herein.

TECHNICAL FIELD

This invention belongs to the power supply management technology domain of electronics equipment, Data Centers, and facility protection, especially relates to A Network Distributed Dynamic Equalized Power Supply Method.

BACKGROUND ART

In the current time, most IT equipment, data center, and facility room adopt the traditional Alternative Current (AC) Uninterruptible Power Supply (UPS) centralized power supply method, and the traditional UPS system adopts the double conversion, Alternative Current (AC) to Direct Current (DC) to Alternative Current (AC), to supply power to the IT equipment, which needs 2 times of conversion processes, and the traditional UPS system adopts the power management method with single measure, and could not flexibly and dynamically distribute the power as per the different electricity consumption status of each different equipment, which causes the waste of electricity. In addition, the safety and reliability of the power management method of the traditional UPS system are poor in case of any fault incurred of UPS, which the power supply of the entire data center will be impacted due to power supply incident and result in the service outage of data center.

Therefore, the current technology is imperfect and has defect, which needs to be improved.

SUMMARY OF THE INVENTION

The technical problem solved by this invention shall be that, for the flaw of the current technology, providing a Network Distributed Dynamic Equalized Power Supply Method.

The technology plan of this invention is shown as below:

A Network Distributed Dynamic Equalized Power Supply Method, including the following steps:

Step 1: There being four power supply modes pre-set in the High Voltage Direct Current power supply device that could be performed, mode A, the rectifier module in the High Voltage Direct Current power supply device converting AC into DC to supply power to the load connected with the High Voltage Direct Current power supply device, in the meantime, to charge the battery inside the High Voltage Direct Current power supply device; mode B, the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to the DC Grid; mode C, the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device; mode D, the High Voltage Direct Current power supply device inputting DC from the DC Grid, to supply power to the load connected with the High Voltage Direct Current power supply device, in the meantime, to charge the battery inside the High Voltage Direct Current power supply device;

Step 2: Multiple High Voltage Direct Current power supply devices being deployed, each High Voltage Direct Current power supply device being parallel connected via the DC Grid, in the meantime, part of High Voltage Direct Current power supply device being configured to be back-up, not connecting with load, and the rest of High Voltage Direct Current power supply devices connecting with the load;

Step 3: The power supply mode of the entire back-up High Voltage Direct Current power supply devices being initially configured to be mode B, and the power supply mode of the rest of High Voltage Direct Current power supply devices being mode A, the power supply voltage of the entire back-up High Voltage Direct Current power supply devices to the DC Grid being the same;

Step 4: When the AC input of a High Voltage Direct Current power supply device in mode A faulting or the function of AC converting into DC faulting, step 5 being proceeded; when the power supply load of a High Voltage Direct Current power supply device in mode A increasing, and the working current increasing, step 5 being proceeded; when the power supply load of a High Voltage Direct Current power supply device in mode C or mode D decreasing, and the working current decreasing, step 6 being proceeded; when the output current of the entire High Voltage Direct Current power supply devices in mode B continuously increasing to the extent that exceeding 80% of the maximum output current of the High Voltage Direct Current power supply device, step 7 being proceeded, when the mentioned output current continuously increasing to the extent that exceeding 90% of the maximum output current of the High Voltage Direct Current power supply device, step 9 being proceeded; when the output current of the entire High Voltage Direct Current power supply devices in mode B continuously decreasing to the extent that lower than 60% of the maximum output current of the High Voltage Direct Current power supply device, step 8 being proceeded; when there being no High Voltage Direct Current power supply device in mode C or mode D, or the difference between the total output current of the entire High Voltage Direct Current power supply devices in mode B and the entire working current larger than or equal to the output current of a certain High Voltage Direct Current power supply device in mode B, and there being non-back-up High Voltage Direct Current power supply device in mode B, step 10 being proceeded; when the power supply load of the entire High Voltage Direct Current power supply devices remaining unchanged, step 11 being proceeded;

Step 5: Changing the power supply mode of the mentioned High Voltage Direct Current power supply device from mode A into mode C or mode D, and decreasing the power supply voltage of the mentioned High Voltage Direct Current power supply device to the DC Grid, to the extent that the current inputted from the DC Grid equal to the shortage of the power supply by the mentioned High Voltage Direct Current power supply device to the load connected thereby;

Step 6: Increasing the power supply voltage of the mentioned High Voltage Direct Current power supply device to the DC Grid to the extent that the mentioned High Voltage Direct Current power supply device could completely undertake the power supply to its load, and then creasing to supply power to the mentioned High Voltage Direct Current power supply device from the DC Grid, then changing the mode of the mentioned High Voltage Direct Current power supply device from mode C or mode D into mode A;

Step 7: Changing the mode of the entire High Voltage Direct Current power supply devices in mode D into mode C;

Step 8: Changing the mode of the entire High Voltage Direct Current power supply devices in mode C into mode D;

Step 9: Changing the mode of the High Voltage Direct Current power supply device in mode A with the minimum output current into mode B;

Step 10: Changing the mode of a non-back-up High Voltage Direct Current power supply device in mode B into mode A;

Step 11: Changing the output current of the entire High Voltage Direct Current power supply devices in mode B to be the same.

A Network Distributed Dynamic Equalized Power Supply Method as mentioned above, is characterized in that, the mentioned High Voltage Direct Current power supply device containing rectifier, battery, battery management module, monitoring module, DC Grid interface, load interface, and the mentioned rectifier connecting with the mentioned AC power source, in the meantime, it being configured that the mentioned rectifier connecting with the mentioned monitoring module; the mentioned monitoring module being configured to connect with the DC Grid interface and load interface, and being configured to connect with the battery via the battery management module; the mentioned battery management module being responsible to control the charging and discharging of battery, the mentioned load interface being used to connect with the load, the mentioned DC Grid interface being used to connect with DC Grid, the mentioned rectifier being used to convert AC into DC; the mentioned monitoring module being configured to monitor and manage the rectifier, battery management module, battery status, electricity consumption status of load, and power supply status of DC Grid, and adjust and change the power supply mode.

A Network Distributed Dynamic Equalized Power Supply Method as mentioned above, is characterized in that, the quantity of power supply voltage decreased from the mentioned High Voltage Direct Current power supply device to the DC Grid as mentioned in step 5 being monitored and controlled by the monitoring module; the quantity of power supply voltage increase from the mentioned High Voltage Direct Current power supply device to the DC Grid as mentioned in step 6 being monitored and controlled by the monitoring module.

By adopting the above-mentioned technology plan, the power supply risk could be spread, and the reliability of the power supply could be improved, in the meantime, the power supply could be flexibly distributed among different power supply devices, to improve the utilization ratio of energy, and reduce the energy consumption.

BRIEF DESCRIPTION OF THE DRAWINGS

FIG. 2 shows four power supply modes pre-set in step 1.

DETAILED DESCRIPTION OF THE PREFERRED EMBODIMENTS

Figure 1:
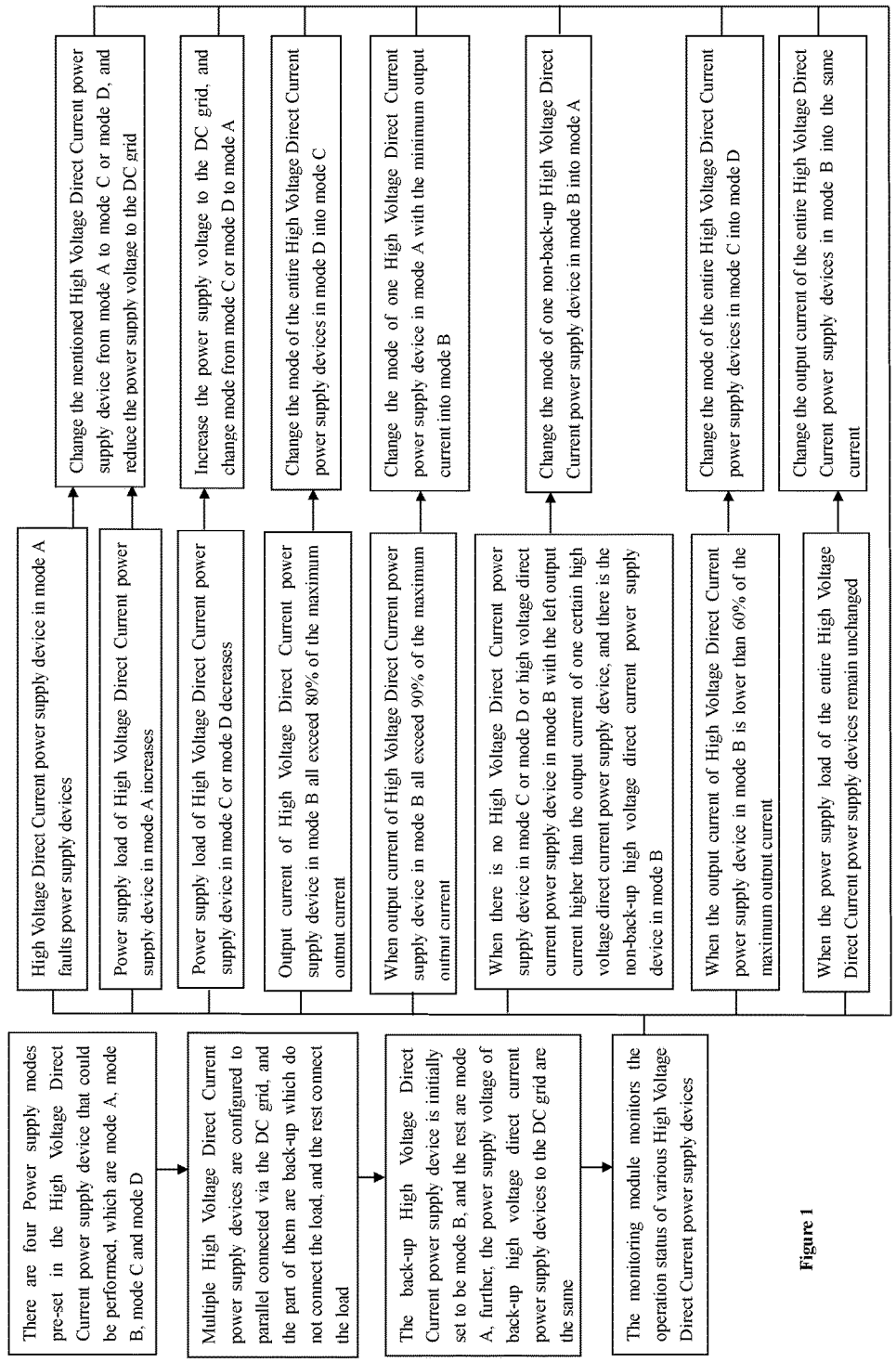
FIG. 1 is the flowchart for a Network Distributed Dynamic Equalized Power Supply Method.

In the below, together with the drawing and specific embodiments, this invention is detailed described.

As shown in FIG. 1, this invention is a Network Distributed Dynamic Equalized Power Supply Method, which adopts multiple High Voltage Direct Current power supply devices to supply power to different loads, in the meantime, the entire High Voltage Direct Current power supply devices form the networked power supply state that mutually supporting to supply power by connecting with DC Grid. During the usage, the quantity of High Voltage Direct Current power supply device shall be provided as per the quantity of equipments in the equipment racks, and the structure of each High Voltage Direct Current power supply device are the same, including rectifier, battery, battery management module, monitoring module, DC Grid interface, and load interface; the mentioned rectifier connects with the mentioned AC power source, the mentioned load interface is used to connect with the load, and the mentioned DC Grid interface is used to connect with the DC Grid.

The mentioned Network Distributed Dynamic Equalized Power Supply Method includes the following steps:

Step 1: There being four power supply modes pre-set in the High Voltage Direct Current power supply device that could be performed, mode A, the rectifier module in the High Voltage Direct Current power supply device converting AC current into DC current to supply power to the load connected with the High Voltage Direct Current power supply device, in the meantime, to charge the battery inside the High Voltage Direct Current power supply device; mode B, the rectifier module in the High Voltage Direct Current power supply device converting AC current into DC current to supply power to the load connected with the High Voltage Direct Current power supply device, in the meantime, to charge the battery inside the High Voltage Direct Current power supply device, and to supply power to the DC Grid; mode C, the battery inside the High Voltage Direct Current power supply device discharging, to supply power to the load connected with the High Voltage Direct Current power supply device, in the meantime, the High Voltage Direct Current power supply device inputting DC current from the DC Grid, to supply power to the load connected with the High Voltage Direct Current power supply device; mode D, the High Voltage Direct Current power supply device inputting DC current from the DC Grid, to supply power to the load connected with the High Voltage Direct Current power supply device, in the meantime, to charge the battery inside the High Voltage Direct Current power supply device;

Step 2: Multiple High Voltage Direct Current power supply devices being deployed, each High Voltage Direct Current power supply device being paralleled in via the DC Grid, in the meantime, part of High Voltage Direct Current power supply device being configured to be back-up, not connecting with load, and the rest of High Voltage Direct Current power supply devices connecting with the load;

Step 3: The power supply mode of the entire back-up High Voltage Direct Current power supply devices being initially set to be mode B, the power supply mode of the rest of High Voltage Direct Current power supply devices being set to be mode A, the power supply voltage of the entire back-up High Voltage Direct Current power supply devices to the DC Grid being the same; the mentioned High Voltage Direct Current power supply devices with the power supply mode being initially set to be mode A could change the power supply mode to be mode A, also could change to mode C or mode D, however, normally, the High Voltage Direct Current power supply device with the power supply mode being initially set to be mode B could only change the power supply mode to be mode A, not mode C or mode D;

Step 4: Under the monitoring of the mentioned monitoring module, various High Voltage Direct Current power supply devices being controlled to conduct the adjustment of power supply voltage and power supply mode as per different conditions and status;

When the AC current input of a High Voltage Direct Current power supply device in mode A faulting or the function of AC current converting into DC current faulting, step 5 being proceeded; when the power supply load of a High Voltage Direct Current power supply device in mode A increasing, and the working current increasing, step 5 being proceeded;

When the power supply load of a High Voltage Direct Current power supply device in mode C or mode D decreasing, and the working current decreasing, step 6 being proceeded;

When the output current of the entire High Voltage Direct Current power supply devices in mode B continuously increasing to the extent that exceeding 80% of the maximum output current of the High Voltage Direct Current power supply device, step 7 being proceeded, when the mentioned output current continuously increasing to the extent that exceeding 90% of the maximum output current of the High Voltage Direct Current power supply device, step 9 being proceeded;

When the output current of the entire High Voltage Direct Current power supply devices in mode B continuously decreasing to the extent that lower than 60% of the maximum output current of the High Voltage Direct Current power supply device, step 8 being proceeded;

When there being not High Voltage Direct Current power supply device in mode C or mode D, or the difference between the total output current of the entire High Voltage Direct Current power supply devices in mode B with the entire working current larger than the output current of a certain High Voltage Direct Current power supply device in mode B, and there being non-back-up High Voltage Direct Current power supply device in mode B, step 10 being proceeded;

When the power supply load of the entire High Voltage Direct Current power supply device remaining unchanged, step 11 being proceeded;

Step 5: Changing the power supply mode of the mentioned High Voltage Direct Current power supply device from mode A into mode C or mode D, and decreasing the power supply voltage of the mentioned High Voltage Direct Current power supply device to the DC Grid, to the extent that the current inputted from the DC Grid equaling to the shortage of the power supply by the mentioned High Voltage Direct Current power supply device to the load connected thereby;

step 6: Increasing the power supply voltage of the mentioned High Voltage Direct Current power supply device to the DC Grid to the extent that the mentioned High Voltage Direct Current power supply device could completely undertake the power supply to its load, and then creasing to supply power by the mentioned High Voltage Direct Current power supply device to the DC Grid, then changing the mode of the mentioned High Voltage Direct Current power supply device from mode C or mode D into mode A;

Step 7: Changing the mode of the entire High Voltage Direct Current power supply devices in mode D into mode C;

Step 8: Changing the mode of the entire High Voltage Direct Current power supply devices in mode C into mode D;

Step 9: Changing the mode of the High Voltage Direct Current power supply device in mode A with the minimum output current into mode B;

Step 10: Changing the mode of a non-back-up High Voltage Direct Current power supply device in mode B into mode A;

Step 11: Changing the output current of the entire High Voltage Direct Current power supply devices in mode B to be the same.

Further, the quantity of power supply voltage decrease from the mentioned High Voltage Direct Current power supply device to the DC Grid as mentioned in step 5 is monitored and controlled by the monitoring module; the quantity of power supply voltage increase from the mentioned High Voltage Direct Current power supply device to the DC Grid as mentioned in step 6 is monitored and controlled by the monitoring module.

Further, the mentioned High Voltage Direct Current power supply device contains rectifier, battery, battery management module, monitoring module, DC Grid interface, load interface, and the mentioned rectifier connects with the mentioned AC power source, in the meantime, it is configured that the mentioned rectifier connecting with the mentioned monitoring module; the mentioned monitoring module is configured to connect with the DC Grid interface and load interface, and is configured to connect with the battery via the battery management module; the mentioned battery management module is responsible to control the charging and discharging of battery, the mentioned load interface is used to connect with the load, the mentioned DC Grid interface is used to connect with DC Grid, the mentioned rectifier is used to convert AC current into DC current; the mentioned monitoring module is configured to monitor and manage the rectifier, battery management module, battery status, electricity consumption status of load, and power supply status of DC Grid, and to adjust and change the power supply mode.

It is understood that, for the normal technical personnel of this domain, the improvement or modification could be conducted as per the above-mentioned content, and the mentioned entire improvement and modification are within the protection scope of the claims of this invention.

What is claimed is:

1. A Network Distributed Dynamic Equalized Power Supply Method comprising the following steps:

Step 1: pre-setting four power supply modes in a High Voltage Direct Current (HVDC) power supply device:

mode A, a rectifier module in the High Voltage Direct Current power supply device converting Alternative Current (AC) into Direct Current (DC) to supply power to a load connected with the High Voltage Direct Current power supply device, in the meantime, to charge a battery inside the High Voltage Direct Current power supply device;

mode B, the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to a DC Grid;

mode C, the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device;

mode D, the High Voltage Direct Current power supply device inputting DC from the DC Grid, to supply power to the load connected with the High Voltage Direct Current power supply device, in the meantime, to charge the battery inside the High Voltage Direct Current power supply device;

Step 2: multiplying High Voltage Direct Current power supply devices being deployed, each High Voltage Direct Current power supply device being parallel connected via the DC Grid, in the meantime, a part of High Voltage Direct Current power supply devices being configured to be back-up, not connecting with the load, and the rest of High Voltage Direct Current power supply devices connecting with the load;

Step 3: setting the power supply mode of the entire back-up High Voltage Direct Current power supply devices to mode B, and setting the power supply mode of the rest of High Voltage Direct Current power supply devices to mode A, a power supply voltage of the entire back-up High Voltage Direct Current power supply devices to the DC Grid being the same;

Step 4: proceeding to step 5 when detecting a fault of an AC input of a High Voltage Direct Current power supply device in mode A or of AC converting into DC, or when a power supply load and working current of a High Voltage Direct Current power supply device in mode A increasing, and the working current increases;

proceeding to step 6 when the power supply load and working current of a High Voltage Direct Current power supply device in mode C or mode D decreases;

proceeding to step 7 when an output current of the entire High Voltage Direct Current power supply devices in mode B continuously exceeds 80% of an maximum output current of the High Voltage Direct Current power supply device;

proceeding to step 9 when the output current continuously exceeds 90% of the maximum output current;

proceeding to step 8 when the output current continuously drops than 60% of the maximum output current;

proceeding to step 10 when there is no High Voltage Direct Current power supply device in mode C or mode D, or the difference between the total output current of the entire High Voltage Direct Current power supply devices in mode B and the entire working current is larger than or equal to the output current of a certain High Voltage Direct Current power supply device in mode B, and there is non-back-up High Voltage Direct Current power supply device in mode B;

proceeding to step 11 when a power supply load of the entire High Voltage Direct Current power supply devices remains unchanged;

Step 5: Changing the power supply mode of the High Voltage Direct Current power supply device from mode A into mode C or mode D, and decreasing the power supply voltage of the High Voltage Direct Current power supply device to the DC Grid, to the extent that a current inputted from the DC Grid equal to a shortage of the power supply by the High Voltage Direct Current power supply device to the load connected thereby;

Step 6: Increasing the power supply voltage of the High Voltage Direct Current power supply device to the DC Grid to the extent that the High Voltage Direct Current power supply device could completely undertake the power supply to the load, and then creasing to supply power to the High Voltage Direct Current power supply device from the DC Grid, then changing the mode of the High Voltage Direct Current power supply device from mode C or mode D into mode A;

Step 7: Changing the mode of the entire High Voltage Direct Current power supply devices in mode D into mode C;

Step 8: Changing the mode of the entire High Voltage Direct Current power supply devices in mode C into mode D;

Step 9: Changing the mode of the High Voltage Direct Current power supply device in mode A with the minimum output current into mode B;

Step 10: Changing the mode of a non-back-up High Voltage Direct Current power supply device in mode B into mode A; and Step 11: Changing the output current of the entire High Voltage Direct Current power supply devices in mode B to be the same, wherein the High Voltage Direct Current power supply device comprises a rectifier, the battery, a battery management module, a monitoring module, a DC Grid interface, a load interface, and the rectifier connects with the AC power source monitoring module;

the monitoring module being configured to connect with the DC Grid interface and the load interface, and being configured to connect with the battery via the battery management module;

the battery management module being responsible to control the charging and discharging of the battery, the load interface being used to connect with the load, the DC Grid interface being used to connect with DC Grid, the rectifier being used to convert AC into DC;

the monitoring module being configured to monitor and manage the rectifier, the battery management module, a battery status, an electricity consumption status of load, and a power supply status of DC Grid, and adjust and change the power supply mode.

2. A Network Distributed Dynamic Equalized Power Supply Method as mentioned in the claim 1, wherein the power supply voltage decrease from the High Voltage Direct Current power supply device to the DC Grid in step 5 is monitored and controlled by the monitoring module;

the power supply voltage increase from the High Voltage Direct Current power supply device to the DC Grid in step 6 is monitored and controlled by the monitoring module.

\* \* \* \* \*